United States Patent [19]

Butler et al.

[11] Patent Number: 4,683,906

[45] Date of Patent: Aug. 4, 1987

[54] TRUNNION TYPE BALL VALVE

[75] Inventors: Ronald G. Butler, Lancaster; John R. Lehman, Columbia; Douglas S. Gray, Lancaster; Wayne R. Houck, Columbia, all of Pa.

[73] Assignee: ITT Corporation, New York, N.Y.

[21] Appl. No.: 802,873

[22] Filed: Nov. 29, 1985

[51] Int. Cl.⁴ .......................... F16L 7/00; F16K 31/44
[52] U.S. Cl. .................................... 137/375; 251/163; 251/170; 251/192; 251/314
[58] Field of Search ............... 251/162, 163, 170, 192, 251/314; 137/375

[56] References Cited

U.S. PATENT DOCUMENTS

| | | | |
|---|---|---|---|
| 3,073,336 | 1/1963 | Johnson | 251/170 |
| 3,146,988 | 9/1964 | Riopelle et al. | 251/170 |
| 3,157,380 | 11/1964 | Sivyer | 251/163 |
| 3,407,838 | 10/1968 | Boteler | 137/375 |
| 3,410,523 | 11/1968 | Kelly et al. | 251/163 |
| 3,458,171 | 7/1969 | Urban | 251/170 |
| 4,147,326 | 4/1979 | Natalizia | 251/192 |

FOREIGN PATENT DOCUMENTS 2075638 11/1981 United Kingdom ............... 251/192

*Primary Examiner*—A. Michael Chambers
*Attorney, Agent, or Firm*—Menotti J. Lombardi

[57] ABSTRACT

A trunnion type ball valve arranged so that biasing means is not needed to establish a seal between the valve seats and the ball when the valve is in the closed position. There is no load on the valve seats in the open position and a sufficient load in the closed position to effect a fluid seal in the closed position. The valve seats are movably mounted in the valve body so that they are displaced during opening and closing movement, but center themselves in the open and closed positions.

8 Claims, 5 Drawing Figures

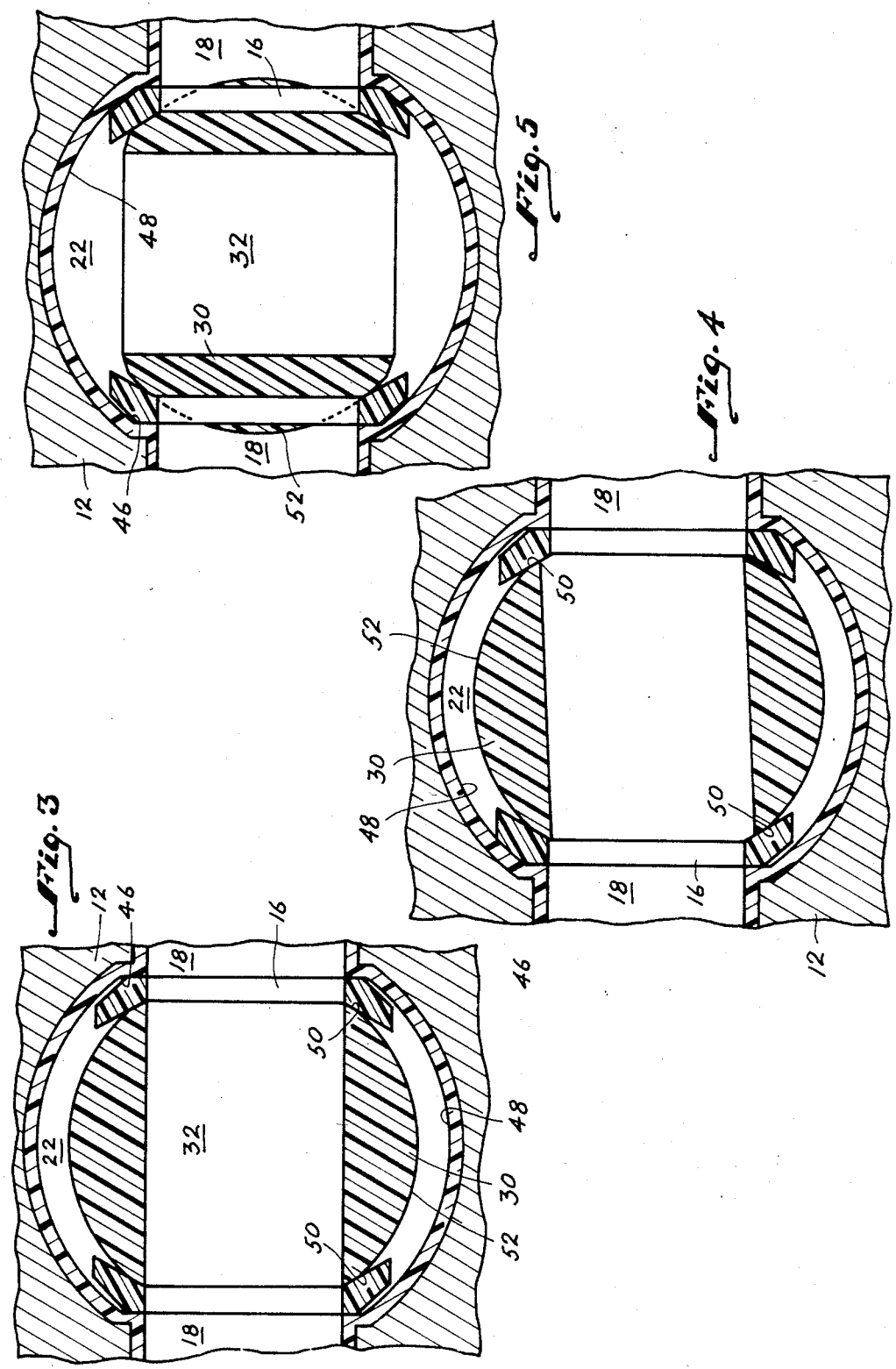

a valve actuators are not torque dependent and would not permit the self-compensation feature to be effectuated.

TRUNNION TYPE BALL VALVE

BACKGROUND OF THE INVENTION

This invention relates to ball valves and, more particularly, to trunnion type ball valves.

Trunnion type ball valves are well known and generally comprise a valve body having inlet and outlet flow passages and a central cavity for receiving a ball valve member. The ball valve member is formed with a bore and a pair of trunnions extending from opposite sides of the ball along a line generally transverse to the bore. By use of the trunnions, the ball valve is rotatably mounted in the central cavity so that it rotates between an open position where the bore is aligned with the passages and a closed position where the ball valve surface extends across the flow passages. Between the ball valve and the portions of the body surrounding the passages, there is located a valve seat member that cooperates with the ball valve surface to prevent flow of fluid through the valve.

Most ball valves of the trunnion type generally include some biasing arrangement for compressing the valve seats against the ball valve member to provide a fluid tight seal between the seats and the ball valve surface when the valve is in its closed position. These biasing arrangements commonly provide for the compressive force even in the open position of the ball valve. This has resulted in extensive wear on the valve seat or on the ball valve surface during the opening and closing movement of the ball valve because of the compressive force. After a while this wear causes the valves to leak and require frequent replacement of the ball valve and/or the valve seats. In addition, use of the biasing mechanism in the first instance adds to the expense of the ball valve and these mechanisms are another source of failure that necessitates replacement. This, of course, adds to the manufacturing and maintenance costs of the valve.

One attempt to avoid the use of the biasing mechanism is disclosed in U.S. Pat. No. 3,410,523 issued to W. Kelly et al on Nov. 12, 1968. In the Kelly patent, there is disclosed a trunnion type ball valve wherein the valve seat faces are not coaxial with the axis of the inlet and outlet flow passages and wherein the ball is not a true spherical surface. The valve seat members are, in fact, offset to either side of the axis of the flow passages to cooperate with opposed eccentric curved portions of the eccentrically shaped ball valve member. With the ball valve disclosed in the Kelly patent, there is no loading or compression of the valve seat in the open position of the ball valve and only a light loading in the closed position. With this type of arrangement, the light loading in the closed position may be insufficient to establish a satisfactory seal and may not satisfactorily eliminate leakage. In addition, the cost of machining the eccentric shape of the ball valve member adds to the manufacturing cost.

Another problem associated with the ball valve disclosed in the Kelly patent results from the self-compensating feature wherein wear of the valve seats is accommodated by merely turning the ball valve member an additional one degree (1°) to three degrees (3°) to obtain the desired seating. This means that the valve cannot be used with conventional valve actuators which operate to rotate the valve through only ninety degrees (90°) from the closed to the open position. Conventional

SUMMARY OF THE INVENTION

Accordingly, it is an object of this invention to provide a ball valve of the trunnion type that eliminates the need for a biasing mechanism for the valve seat.

It is another object of this invention to provide a trunnion type ball valve that eliminates the need for a biasing mechanism for the valve seat and which provides for a satisfactory compression loading and thus sealing between the ball member and the valve seat in the closed position.

It is yet another object of this invention to provide a top entry trunnion type of ball valve that is plastic lined so that it is usable with corrosive fluids.

Finally, it is an object of this invention to provide a plastic lined, top entry, trunnion type ball valve that is relatively simple, inexpensive and easy to manufacture and maintain.

These and other objects of this invention are accomplished by providing a valve body having flow passages formed therein with a central cavity formed between these passages. Also provided is a ball valve member formed with a bore and a pair of trunnions extending from opposite sides of the valve member surface. By use of the trunnions, the ball valve member is rotatably mounted in the cavity for rotation between open and closed positions. There is also provided a pair of valve seat members located in the cavity between the valve body and the ball valve member such that the valve seat members are movable relative to the valve body. The ball valve member has a surface configuration that exerts substantially no load on the valve seat members in its open position and that compresses the valve seat member against the valve body member in its closed position. Preferably, the surface configuration causes limited movement of the valve seat members in the direction of its movement when moving between the open and closed position and then causes the valve seat members to move back in the opposite direction until they center themselves with respect to the flow passages.

BRIEF DESCRIPTION OF THE DRAWINGS

For a better understanding of the invention, reference is made to the following detailed description of a preferred embodiment with reference to the figures of the accompanying drawing, in which:

FIGS. 3 through 5 are section views taken generally through the line 3—3 of FIG. 1 illustrating the open position of the valve, an intermediate position of the valve and the closed position of the valve, respectively.

DETAILED DESCRIPTION OF A PREFERRED EMBODIMENT

Figure 1:
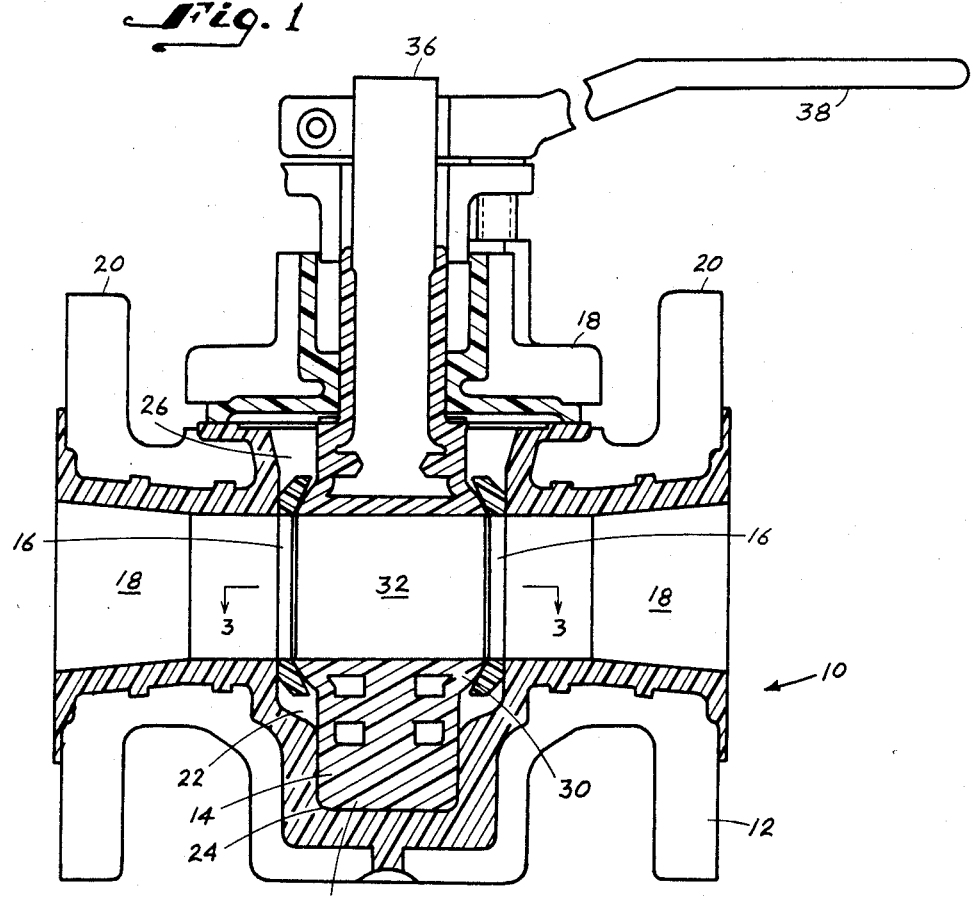
FIG. 1 is a section view through a ball valve in accordance with this invention.

In FIG. 1 of the drawing, there is disclosed a ball valve 10 including a valve body 12, a ball valve member 14 and a pair of valve seats 16,16. The ball valve 10 disclosed here is of the type generally referred to as a "top entry" ball valve. In addition, the valve body 12 and ball valve member 14 are lined with a plastic material along the surfaces exposed to fluid so that it is usable with corrosive fluids. The plastic lining is clearly denoted in the drawing. The plastic lining can be applied to the valve body 12 and ball valve member 14 in accordance with the techniques disclosed in U.S. Pat. No. 3,407,838 issued to H. W. Boteler on Oct. 19, 1968. It should be understood that the plastic lining is not necessary for the practice of the invention.

The valve body 12 is made of metal by conventional casting techniques and the plastic lining is applied as noted above. It includes a pair of aligned flow passages 18,18 which are used for the inlet and outlet flow of fluid. Adjacent the open end of each passage 18 there is formed a flange 20 used to secure the valve to mating flanges formed on flow pipes. Between the inner ends of the flow passages 18,18, the valve body 12 is formed with a central cavity 22 having a generally spherical shape. The configuration of the central cavity 22 will be explained in more detail hereinafter, but it should be noted that the size and configuration of the cavity is such that it does not restrain movement of the valve seats 16,16 and that the valve seats can move relative to the valve body over at least a limited distance. Extending from the bottom of the central cavity 22, as viewed in the drawing, is a generally cylindrical cavity 24 and opposite this cylindrical cavity is a somewhat enlarged opening 26 that permits entry of the ball valve member 14 and the valve seats 16,16 during assembly of the valve. After assembly, a cover 28 is placed over the opening 26 and secured to the body member 12 by suitable fasteners so that the body member is closed except for the open end of the passages 18,18. The cover 28 is also plastic lined as shown in FIG. 1.

The ball valve member 14 includes a ball portion 30 formed with a bore 32 extending therethrough. In use, the bore 32 aligns with the passages 18,18 to allow the flow of fluid through the valve. Extending from the outer surface of the ball portion 30 along a line generally perpendicular to the bore 32 is a trunnion 34 which is received in the cylindrical cavity 24 and rests on the bottom wall thereof; extending along this same line and opposite the trunnion 34 is a shaft 36 which extends axially through the opening 26 and the cover 28. As is usual, bearings and packings are provided between the cover 28 and shaft 36 and a handle 38 is attached to the projecting end of the shaft for use in rotating the ball valve member. It can be seen that the ball valve member 14 can be rotated between the open position described above, through about 90°, to a closed position (see FIG. 5) wherein the outer surface of the ball portion 30 extends across the valve seats 16,16 and their adjacent passages 18,18.

Figure 2:
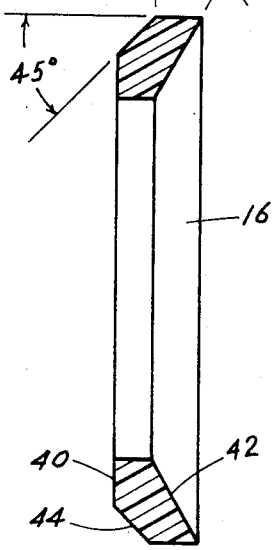
FIG. 2 is an enlarged view of one of the valve seats illustrated in FIG. 1.

The valve seats 16,16 are generally annular members made of a somewhat resilient material, for example, fiberglass reinforced TFE plastic. The inner diameter of each of the annular valve seats 16 is substantially equal to the diameter of the passages 18,18. Inasmuch as the valve seats 16,16 are the same, only one need be described and such description is made with reference to FIG. 2. One side of the valve seat 16 is formed with a generally flat bearing surface 40 which extends from the inner periphery of the annular member to a point intermediate the inner and outer peripheries. The opposite side of the annular member is formed with a frusto-conical sealing surface 42, that is, the surface 42 extends at an acute angle to the bearing surface 40. In the preferred embodiment disclosed herein, the angle between the sealing surface 42 and the bearing surface 40 is approximately 30°. An inclined surface 44 extends from the radially outer end of the bearing surface 40 to the outer periphery of the annular member so that it too forms an acute angle with the bearing surface. In this embodiment, the exterior angle between these surfaces is approximately 45° so that the interior angle is approximately 135°.

As best seen in FIGS. 3 through 5, the central cavity 22 formed in the body member 12 is formed with a pair of flat surfaces 46,46 which surround the passages 18,18 and which are conneced by generally spherical surfaces 48,48. The flat bearing surfaces 40,40 of the valve seats 16,16 are adjacent these flat surfaces 46,46. The width, that is, the extent of the flat surfaces as viewed from the top is just slighty larger than the diameter defined by the outer periphery of the flat bearing sufaces 40,40 so that the valve seats 16,16 can move slightly in the circumferential direction of the ball portion 30. As seen in FIG. 1, the length of the flat surfaces, that is, the distance between the open end of opening 26 and the intersection between the central cavity 22 and the cylindrical recess 24 is also larger than the inner and outer diameter of the annular member. Thus, the valve seats 16,16 are unrestrained by the valve body 12 so that they would be movable therein except for the interaction with ball portion 30.

The ball portion 30 of the ball valve member 16 has the general configuration described in U.S. Pat. No. 4,147,326 issued Apr. 3, 1979 to A. Natalizia. As best seen in FIGS. 3 through 5, the outer surface of the ball portion 30 includes first surface portions 50,50 in the form of frusto-conical surfaces which extend at an angle complementary to the sealing surface 42 on the valve seats. These first surface portions 50,50 extend around the open ends of the bore 32 so that in the open position of the valve, the first surface portions are adjacent the sealing surfaces. Because the angle on the surfaces 50 is the same as the angle on the sealing surfaces 42, and because of the dimensions selected for the ball, seat and cavity, there is no load exerted between the ball valve and the valve seats in the open position of the valve. In effect, the valve seats are trapped between the ball valve member and the valve body but they are not clamped in place. Connecting the first or frusto-conical surfaces 50,50 is a second surface portion 52 which is generally spherical and of such a diameter that it loads the valve seats 16,16 in compression when the ball valve member is in the closed position illustrated in FIG. 5. In this position, the spherical surface 52 clamps the valve seats 16 against the flat surfaces 46,46 and then compresses the material of the valve seats so that a tight sealing engagement is provided between the sealing surfaces 42 and the spherical surface 52. It should be understood that other suitable configurations could be utilized for the ball portion 30 to accomplish the functions performed, e.g., the ball portion 30 could be elliptical and the first and second portions described above would correspond to portions with different radii along the ellipse.

During movement of the ball valve member 14 between its open and closed positions, the valve seats 16,16 are moved through a limited distance in the same direction as the ball portion 30. This movement is illustrated in FIG. 4 showing the movement of the valve seats 16,16 as the ball valve member 14 moves from its open to closed position. When the inclined surfaces 44 of the valve seats 16 butt against the spherical surfaces 48 in the central cavity 22, further movement is prevented and continued movement of the ball valve member causes the valve seats to snap back in the opposite direction until they are centered with respect to the passages 18,18. During this movement, very low loading is maintained on the seat throughout most of the 90° rotation. As the valve is finally closing, and the seats are centered, a high compressive load is effected to provide an effective sealing. The trunnion 34 and valve stem 36 distribute the loads evenly over the entire bearing area and such even distribution is, of course, of extreme importance in plastic lined valves which cannot withstand the same high loading as metal.

The circumferential movement of the valve seats 16,16 need not be stopped by the spherical surfaces 48. If desired, the flat surfaces 46,46 can be larger and the ball portion 30 would snap the seats back to center when the ball diameter crosses a certain point.

To assemble the ball valve member 14 and valve seats 16,16 in the valve body 12, either during an initial assembly or replacement, the cover 28 is, of course, removed and the ball valve member and seats are inserted through the opening 26 into the central cavity 22 with the trunnion 34 extending into the cylindrical cavity 24. The tolerances are such that the insertion is relatively easy so long as the insertion is made with the valve in the open position.

While in the foregoing a preferred embodiment of the invention has been disclosed, it should be obvious to those skilled in the art that various changes and modifications can be made within the scope of the appended claims.

We claim:

1. A ball valve comprising a valve body having flow passages formed therein and a cavity formed therebetween, a ball valve member having a bore extending therethrough, said ball valve member being mounted in said cavity for rotation between open and closed positions, a pair of valve seat members located in said cavity between said valve body member and said ball valve, said valve seat members being movable relative to said valve body member, said ball valve member having a surface configuration for exerting substantially no load on said valve seat members in its open position and for compressing said valve seat member against said valve body member in the closed position, said surface configuration including first surface portions adjacent each end of said bore, said first surface portions being generally complementary to the adjacent surface of said valve seat members and a second surface portion of increasing projection extending between said first surface portions, said first surface portions being frusto-conical surfaces and said second surface portion being generally spherical.

2. A ball valve in accordance with claim 1, wherein said surface configuration of said ball valve member causes limited movement of said valve seat members, said movement of said valve seat members occuring in the direction of movement of said ball valve member when said ball valve member is displaced between an open and closed position and said surface configuration further causing said valve seat members to move in the opposite direction until centering with respect to said passages occurs.

3. A ball valve in accordance with claim 1, wherein interior surfaces of said valve body and exterior surfaces of said ball valve member are lined with a plastic material.

4. A ball valve in accordance with claim 1, wherein said ball valve member is formed with trunnions which cooperate with said valve body to enable the ball valve member to rotate.

5. A ball valve comprising a valve body having a pair of aligned passages spaced apart by a cavity, a ball valve member in said cavity, said ball valve member having a bore extending therethrough and a pair of trunnions, each of said trunnions extending from opposite sides of said ball valve member for mounting said member in said cavity for rotation between an open position wherein said bore is aligned with said passages and a closed position, a pair of generally annular valve seat members having a valve seating surface on one face, each of said valve seat members being located in said cavity adjacent one of said passages with said valve seating surfaces being adjacent said ball valve member, said valve seat members being located in said cavity and movable relative to said valve body, said ball valve member being formed with first surface portions adjacent each side of the bore which are generally complementary to said valve seating surfaces and a second surface portion extending between said first surface portions, said first and second surface portions being related to each other and to said valve seating surfaces to cause said valve seat members to be compressed between said valve body member and said second surface when said ball valve member is in its closed position and receive substantially no load when said ball valve member is in an open position, said valve seat members moving circumferentially during opening and closing movement of said ball valve member in a first direction in accordance with the movement of said ball valve member, and in an opposite direction until centered about said passages.

6. A ball valve in accordance with claim 5 wherein said second surface portion is generally spherical.

7. A ball valve in accordance with claim 5 wherein said first surface portions are frusto-conical surfaces.

8. A ball valve in accordance with claim 5 wherein said cavity, said passages, said bore, said first and second surface portions and said trunnions are lined with plastic material.

* * * * *

UNITED STATES PATENT AND TRADEMARK OFFICE
CERTIFICATE OF CORRECTION

PATENT NO. : 4 683 906

DATED : Aug. 4, 1987

INVENTOR(S) : Ronald G. Butler, John R. Lehman

It is certified that error appears in the above-identified patent and that said Letters Patent are hereby corrected as shown below:   Title page:

Delete Douglas S. Gray and Wayne R. Houck as inventors.

Signed and Sealed this

Twenty-third Day of February, 1988

Attest:

DONALD J. QUIGG

*Attesting Officer*          *Commissioner of Patents and Trademarks*